United States Patent Office 2,971,936
Patented Feb. 14, 1961

2,971,936
POLYETHER RESINS FROM ALKALINE CONDENSATION OF POLYHYDRIC PHENOL WITH ALIPHATIC POLYHYDRIC ALCOHOL HAVING TERMINAL HYDROXYL GROUPS ESTERIFIED WITH SULFURIC ACID AND METHOD OF MAKING SAME

Marcel Dubien and Pierre Vacelet, Paris, France, assignors to Stoner Mudge, division of American Marietta Company, Chicago, Ill., a corporation of Illinois No Drawing. Filed July 28, 1958, Ser. No. 751,118

22 Claims. (Cl. 260—43)

The present invention relates to a method for preparing terminal sulfuric acid esters of polyhydric aliphatic alcohols particularly useful as intermediates in the preparation of resinous polyethers by reacting said esters with polyhydric phenols, preferably polynuclear polyhydric phenols. The present invention also relates to methods for preparing resinous aliphatic aromatic polyethers in the presence of a basic reagent and the resinous aromatic aliphatic polyethers produced by these methods.

In accordance with the present invention, an aliphatic polyhydric alcohol is esterified on the terminal hydroxyl groups with a molecular reacting amount, preferably up to 50% excess of 95–100% sulfuric acid at a temperature below 25° C., preferably from —5° C. to +20° C., to form the corresponding mineral acid ester.

The reaction may be carried out with sulfuric acid or sodium acid sulfate. The reaction is in accordance with the following equations:

(1)
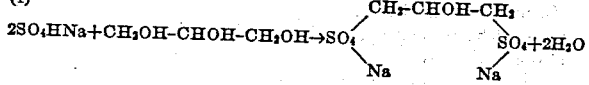

(2)
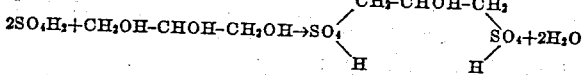

The acid ester from Reaction 2 may be neutralized.
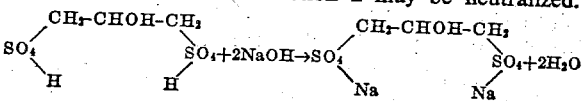

The neutralized acid ester is then reacted with a polyhydric phenol.

(4)
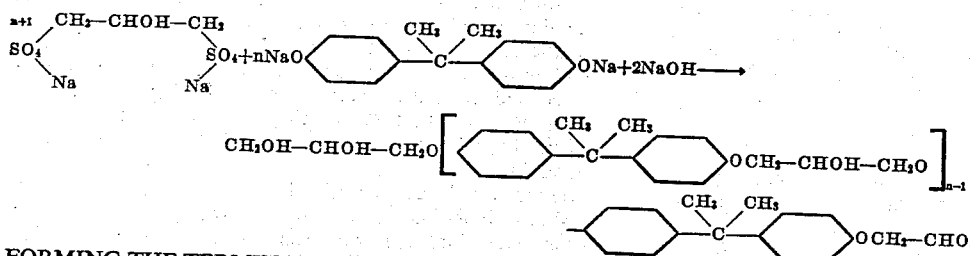

FORMING THE TERMINAL SULFATE ESTER WITH END PRIMARY HYDROXYL GROUPS OF THE ALCOHOL

The formation of the terminal disulfate ester is enhanced at decreasing temperatures approaching 0° C. In the presence of an excess of sulfuric acid, preferably up to about 50 percent molar excess based upon twice the number of mols of glycerin which are employed, the aliphatic polyol is substantially completely converted to terminal sulfate ester. However, substantial amounts of the monosulfate ester may be present, this amount depending upon the strength of the acid employed and the temperature of reaction.

Generally, the amount of terminal monosulfate ester of glycerin which is produced decreases with decreasing temperature, e.g., at 0° C., about 87% of disulfate ester and about 14% of monosulfate terminal ester are produced when using 98.6% sulfuric acid in an amount of 50% molar excess over 2 mols of sulfuric acid per mol of glycerin. At 10° C., the same excess acid concentration in the same molar proportions provides about 5% more of the monosulfate terminal ester at the expense of the disulfate terminal ester. As the concentration of the concentrated sulfuric acid is decreased and in the same 50% molar excess based upon 2 mols of sulfuric acid per mol of glycerin, the amount of monosulfate produced at the expense of the disulfate terminal ester may rise up to about 33%.

The utilization of disulfate ester containing more than 33% on a molar basis of monosulfate terminal ester provides resinous products upon condensation with polyhydric phenol which are unduly diluted, i.e., they are not satisfactory by virtue of the presence of the monosulfate condensation products therein. Accordingly, the minimum acid strength of sulfuric acid is 95%, in order that satisfactory resinous products be produced.

The disulfate terminal ester of the aliphatic alcohol, e.g. glycerin, can be stored for longer periods of time, preferably under refrigeration at 0° C. without appreciable increase in the monosulfate content but it is preferred, by reason of economy, to utilize the ester immediately after its formation for the condensation reaction.

NEUTRALIZATION IN ACCORDANCE WITH EQUATION 3

During neutralization of the sulfuric acid ester of the polyhydric alcohol, the instability of the sulfate ester tends to cause a substantial increase in monosulfate formation by hydrolysis of the disulfate. For example, neutralization carried out at 10 to 25° C. results in an increased monosulfate content of from about 14 to 15% and when the temperature goes to about 105° C., as much as 15% more of free glycerol may be regenerated.

Since the condensation is carried out at temperatures at which there is a hydrolysis of the ester, it is essential that the condensation reaction be faster than the hydrolysis reaction.

It is necessary to carry out the condensation reaction with a disulfate ester containing a minimum of 66% disulfate ester. The best results are achieved with a monosulfate content of not more than about 16% and a disulfate content of at least 70% whereby excellent reproducibility of high quality, high melting resin product is achieved.

In the foregoing discussion, sodium hydroxide is typical of any alkali metal hydroxide, i.e., sodium hydroxide, potassium hydroxide, lithium hydroxide, etc., and is described herein in an exemplary rather than limiting manner.

During the neutralization step, it is preferred to use the theoretical quantity of sodium hydroxide for replacement of the acid hydrogen atoms in the terminal sulfate radicals of the glycerin sulfate.

Work has also been carried out to compare the condensation in accordance with reaction 4 between purified glycerol sulfate from which the monosulfate has been removed with the preferred commercial procedure in which up to 33% of monosulfate is present and the resinification is carried out in situ. Although better yield of the resin having a preferred melting point between 90–100° C. is realized by utilization of the purified glycerol disulfate as the starting material, equivalent results can be achieved by resinification in situ as long as the monosulfate content of the glycerol disulfate is less than about 15%.

CRITICAL CONDITIONS FOR CONDENSATION REACTION—EQUATION 4

The condensation reaction is carried out at a temperature of about 95–105° C. to produce polyether resins having melting points between about 60–115° C., and preferably between 90–100° C. The minimum effective temperature for the condensation reaction is about 60° C. At condensation temperatures lower than about 90° C., the products have a substantially lower melting point than about 65° C. and are not preferred.

If the sulfate diester is heated for an insufficient period of time with sodium hydroxide during condensation, 5 minutes for example, then there is less than about 75% yield of a resin having a melting point of about 50° C.; if heating is carried out for a total time of two hours, then there is a better conversion to a 68° C. melting point resin; and if heating is carried out for a total time of three hours, there is a 97% yield of a 92° C. melting point resin.

In view of the foregoing, it has been determined that a minimum time of condensation reaction for in situ resinification is about 3 hours in order to achieve a melting point of the resin product which is above 90° C. This minimum time of 3 hours is based upon reaction carried out under atmospheric pressure conditions since, as explained later, reaction under super-atmospheric conditions may proceed to the desired end point in a shorter period of time, e.g., 1 to 2 hours.

It is believed that sulfuric acid provides a unique action in its participation in the condensation reaction because it is a strong mineral acid which is completely eliminated from the reaction product of the polyhydric alcohol mineral acid ester with the polyhydric phenol while in no way contributing to side reactions. This is not true of chloride esters and this type of ester has heretofore caused great difficulty in the preparation of commercial polyether resins.

The reaction may be performed at temperatures above 160° C. by using an autoclave, but this procedure is not convenient and the products achieved at atmospheric pressure are satisfactory for most purposes. The temperatures may be controlled at lower than 100° C. by introducing azeotropic solvents such as butyl alcohol and isoamyl alcohol.

It is necessary to add the sodium hydroxide progressively at or near reflux temperature in order to obtain a product having a high melting point. The temperature for most rapid condensation is close to the reflux temperature. If the alkali is added at a reaction temperature which is lower than 80° C., the condensation reaction does not proceed at a controlled and sufficient rate to provide high melting resin products.

It is preferred that the theoretical quantity of sodium hydroxide be added at a first stage of the reaction in a relatively short time while the excess amount (.5–1.5 mols) of sodium hydroxide be added in a second stage of the condensation reaction wherein the condensation continues over a longer time period. In this manner, there is achieved the maximum conversion—96 to 97%—at the highest melting points of the product—102–105° C.

The product of the reaction numbered (1) may be utilized directly in aqueous solution with bulk reactants or in an inert organic solvent in which it may be dispersed or dissolved. Since the alcohol disulfate ester is insoluble in toluene, ethanol, dioxane, chloroform, butyl acetate, methyl ethyl ketone, and isophorone, it is necessary to prepare the sulfate ester product in finely divided form if a non-aqueous organic medium is employed, and to use it in suspension therein. Removal of water can be readily carried out by azeotropic distillation. In this case, care should be taken to maintain the finely divided character of the dispersed product and avoid the formation of lumps while removing water by entrainment.

The polyhydric aliphatic alcohols which may be used to make terminally-substituted disulfate esters or ester salts in accordance with the invention contain at least two terminal hydroxyl groups and include ethylene glycol, polyethylene glycol, propylene glycol, 1,4-butane diol, glycerol, polyglycerin, erythritol, sorbitol, trimethylol propane, etc.

The polyhydric phenols which may be used in accordance with the invention may be mononuclear or polynuclear but the polynuclear dihydric phenols are preferred; in these, the nuclei can be joined directly or can be joined by an intermediate hydrocarbon chain of one or more carbon atoms. Examples of suitable polyhydroxy mononuclear phenols are resorcinol, catechol, pyrogallol and phloroglucinol. Examples of suitable polyhydroxy polynuclear phenols which constitute the preferred class of phenols include Di(4-hydroxyphenyl) methylmethane
Di(4-hydroxyphenyl) dimethylmethane
Di(4-hydroxyphenyl) methylethylmethane
Di(4-hydroxyphenyl) propylmethane
Di(4-hydroxyphenyl) dipropylmethane
Di(4-hydroxyphenyl) phenylmethane
4,4'-dihydroxy diphenyl
1,1-bis (4-hydroxyphenyl)-4-methylcyclohexane
1,1'-bis (4-hydroxyphenyl)-3,5-dimethylcyclohexane
2,2-bis (4-hydroxyphenyl) naphthane Other phenols which may be used but which react more slowly than the preferred phenols are:

Di(4-hydroxy-3,5-dimethylphenyl) dimethylmethane
Di(4-hydroxy-3-methyl-5-chlorophenyl) dimethylmethane
Di(4-hydroxy-3,5-dichlorophenyl) ethylmethane
Di(4-hydroxy-3,5-dichlorophenyl) methylethylmethane The terminal sulfuric acid esters of polyhydric aliphatic alcohols may be used for purposes other than intermediates in the method of preparing resinous polyethers in accordance with the present invention. These sulfuric acid esters with glycerin may be used in etherification reaction with sodium salts of intermediate aliphatic alcohols such as sodium 2 ethyl hexylate whereby di-2 ethyl hexyl ethers are produced which can be sulfated and utilized as wetting and dispersing agents. See Scott Patent 2,161,937 for the usefulness of these types of products illustrated as alpha, alpha'-di(2 ethyl hexyl) glycerin ether monosulfate. In preparing the compounds which are described in the Scott patent, the sodium alcoholate is reacted with the glycerin disulfate ester (terminal sulfuric ester groups) under alkaline condition as with sodium hydroxide or potassium hydroxide.

Synthetic polyether resins have been prepared (a) by condensation of polyhydric phenols with hydrochloric acid esters of polyhydric aliphatic alcohols followed by dehydrohalogenation (see patent to Arvin, No. 2,060,715) and (b) by etherification of a polyhydric phenol with epichlorohydrin followed by halogen removal.

The synthetic polyether resins under (a) prepared by reacting polyhydric phenols or their metal derivatives with organic polyhalides whose halogen atoms are all attached to different aliphatic carbon atoms have been deficient because of their low softening point (see patent to Rothrock, No. 2,191,587 at page 1, column 1, lines 10–13 and line 18).

The process of the present invention overcomes this deficiency and provides an entirely new etherification reaction utilizing terminal sulfuric acid esters of polyhydric aliphatic alcohols, solid polymeric ethers having a higher melting point range of from 60° C. up to 110° C. which surpass in performance the known low-melting polyether resins.

Although the polyepoxide polyether resins have achieved success as in paints, varnishes, and potting compounds due to their good chemical resistance and flexibility, it has been difficult to provide uniformly reproducible products because of the difficulty encountered in removing the last portions of halogen. Further, there is some difficulty in controlling the course of reaction so as to prepare the same type of aromatic aliphatic polyether resin in each instance, and it is frequently necessary for the user of the resin to take into account variation of salt content and free and combined chlorine as these factors affect further modification of the polyether resins of the diepoxide type.

The present commercial procedures for the preparation of polyether resins which involve halogen removal require extremely close control in order that polyethers can be produced which are sufficiently reactive to cure to the desired film properties of hardness and flexibility and which are not objectionably discolored. If chlorine is not completely removed appropriate adhesion cannot be attained in coatings or adhesives.

It is presently thought that hydrolyzable and bound chlorine above a very low value cause discoloration. This reactivity of chloride appears in most cases where chloride is not eliminated completely during etherification. These darker products have poorer heat resistance and in general, have poor chemical resistance due to the presence of the chloride ester linkage in the molecule.

The present invention provides an entirely different mechanism than that of proceeding through the hydrochloric acid ester, for preparing polyethers and insures the complete elimination of the mineral acid without encountering the degrading effect on color, flexibility and chemical resistance.

PROPERTIES OF POLYETHER RESINS OF THE INVENTION

In comparison to the closest comparable commercial polyether, hydrated Epikote 1001, which is a polymeric diglycidyl ether of bisphenol A that before hydration has a melting point of 64–76° C. and after hydration has a melting point of 102° C. and a Gardner color of 8", the present polyether resins have less color, narrower molecular weight ranges and a more even distribution of molecular weight fractions within the molecular weight range. The solid polyether resins of the invention have a melting point in preferred embodiments varying from 60–115° C. Within this range of melting points, polymers melting from 70–95° C. are more readily prepared.

The bulk of the resin of Example II of the application, i.e., about 80% thereof has an average molecular weight of 542 which varies only about 300–400 units for fractions separated by solvent precipitation. In contrast, about 900–925 molecular weight units of spread are found in the corresponding solvent precipitated fractions of hydrated Epikote 1001.

In comparison with the hydrolyzed Epikote 1001, the resin of Example II has a higher average hydroxyl value which is more highly reactive for further modification to improve the properties of the coating. The hydroxyl value (number of OH per 100 grams of resin) goes up uniformly between 0.58 to 0.75 in increasing molecular weight fractions recovered by solvent precipitation using the resin of Example II.

In contrast the hydroxyl value of hydrated Epikote 1001 fractions recovered in the same molecular weight fractions by solvent precipitation is non-uniform, and higher hydroxyl values are associated with the same molecular weight fraction of hydrated Epikote 1001 than with the corresponding fraction of Example II, i.e., 0.76 hydroxyl value for fraction of molecular weight 675 in hydrated Epikote 1001 as contrasted with 0.62 hydroxyl value for fraction of molecular weight 650 in the resin of Example II.

The resin of Example II is characterized by narrower and more uniform molecular weight distribution at lower average molecular weight than hydrated Epikote 1001. By virtue of the higher hydroxyl number and higher degree of uniformity, reaction with cross-linking agents via the hydroxyl group such as by esterification or by isocyanate reaction or by aminoplast modification provides a greater degree of predictability in film performance than in the instance of the corresponding epoxy resin modification.

The resinous products of the present invention are clear and almost colorless at elevated temperatures and have excellent resistance to alkaline solutions, alkaline peroxide solutions and acetic acid.

The compositions of the invention are soluble in a great number of solvents such as ethylene glycol, ethyl acetate, butyl acetate, dioxane, chloroform, dichloroethane and mixtures of aromatic hydrocarbons and aliphatic or aromatic ketones. Accordingly, solutions may be prepared in any of these solvents or in mixtures thereof for use in coatings, enamels and adhesives.

The invention is illustrated in the following examples:

Example I 94 grams of 98% pure glycerin were added slowly to 292 grams of approximately 100% pure sulfuric acid. The mixture was maintained for two hours at a temperature of between 0 to 10° C. The excess sulfuric acid was then neutralized while cooling with a solution of 30 grams of sodium hydroxide in water to make 100 grams of solution having a specific gravity of 1.33. An additional 410 cubic centimeters of the 30% solution of sodium hydroxide solution and 131 grams of diphenylol propane were added as the reaction mixture was heated to reflux for one hour at a temperature of 95–100° C. whereby the polyether resin was produced.

The resin was separated, washed with warm water to neutrality and dried at 105–110° C. The yield was about 95% based on the diphenylol propane. The resin was transparent, very slightly colored and brittle. The resin had a melting point of about 92° C. as measured by Durrans mercury method and its esterification was 154.

Example II

An amount of 378 grams of glycerin sulfate (0.690 mols) prepared as in Example I was cooled with an ice-salt mixture to 0° C. and 403 cubic centimeters of a solution of 30 grams of sodium hydroxide per 100 grams of solution having a specific gravity of 1.33 were added slowly with agitation to keep the temperature below 10° C. The following is the time-temperature data for the caustic addition:

| Time: | Temperature, ° C. |
| --- | --- |
| Start | 4 |
| 30 minutes | 4 |
| 1 hour | 6 |
| 1½ hours | 8 |
| 2 hours | 6 |
| 2½ hours | 8 |
| 3 hours | 9 |
| 3 hours 12 minutes | 10 |

End: acid medium. To the acid medium there were added 131 grams of diphenylol propane (0.575 mol) and 57 cubic centimeters (0.57 mol) of the same 30% solution of sodium hydroxide and the alkaline mixture was heated to a reflux temperature of 104° C. in 35 minutes. The alkaline mixture was maintained at reflux for two hours, during which time 148 cubic centimeters of 30% solution of sodium hydroxide (1.48 mols) were added. At the end of the two hour period, 205 cubic centimeters (2.05 mols) of the sodium hydroxide solution were added, and the temperature maintained at 90—105° C. under reflux for another hour. Heating was then stopped, the product transferred and cooled, the resin separated and given six washes until washings were no longer alkaline. The resin was dried for 20 hours at 105–110° C. in an oven and a transparent resin was obtained. The weight of the resin was 158 grams. Yield was 97% of a resin having a melting point of 92° C. The esterification equivalent was 154.

In the foregoing procedure a total heating time of three hours provided a resin having a melting point of 92° C. and in a 97% yield. By cutting the heating time down to two hours, i.e., first addition of sodium hydroxide with 1 hour of reflux and second addition at 1 hour of reflux, the resin produced had a melting point of 74° C.

By suitably withdrawing samples during this condensation period, any predetermined melting point can be obtained with a melting point range between 70 to 92° C. By heating for longer periods than three hours, e.g., 4 to 6 hours, higher melting points up to about 102° C. were obtained.

*Example III*

46 grams of pure glycerin, 123 grams of sodium acid sulfate and 200 cubic centimeters of dry toluene were heated at reflux in a round bottom flask equipped with an agitator and a water separator. After azeotropic elimination of the water of reaction, there was obtained a mass which was very brittle when cold and which dissolved in 150 cubic centimeters of water. To this mass were added 123 grams of diphenylol propane and 119 cubic centimeters of a solution of 30 grams of sodium hydroxide in water to make 100 grams of solution having a specific gravity of 1.33 and 250 cubic centimeters of butanol. The mixture was heated to reflux for two hours after which time the reaction was completed.

Butanol and toluol were eliminated by azeotropic distillation and the resin was washed in warm water in accordance with the procedure outlined in Example I to provide a pure polyether resin having a melting point of 75° C.

This procedure was repeated using di(4-hydroxyphenyl) methylmethane in the same molar proportions and a similar clear polyether resin was obtained.

*Example IV*

48 grams of glycerin, 34 grams of ethylene glycol and 276 grams of sodium acid sulfate in toluene solution were heated at reflux for 7 hours in a round bottom flask equipped with a water separator to form disulfate of glycerin and glycol. The disulfate of glycerin and glycol was then dissolved in 250 cubic centimeters of water. 190 cubic centimeters of this neutralized solution were then added to a mixture of 92 grams of diphenylol propane, 80 cubic centimeters of a solution of 30 grams of sodium hydroxide in water to make 100 grams of solution having a specific gravity of 1.33 and 240 cubic centimeters of water, and the mixture was heated at reflux for 2 hours. The solid clear resin produced was washed with warm water until neutrality and had properties (melting point and esterification equivalent) similar to that of Example III.

In the present example, ethylene glycol alone was employed instead of the mixture of glycerin and ethylene glycol. This additional run was carried out in toluene solution at reflux conditions for 7 hours in a round bottom flask equipped with a water separator to form the glycol disulfate and to remove the water. Condensation with diphenylol propane was carried out in the same manner and using the same molar proportions as indicated hereinabove, and a clear resin was produced.

The same procedure of this additional example was carried out using propylene glycol and after forming the disulfate ester in toluene, condensing in alkaline medium with the same molar proportions as in the foregoing ethylene glycol procedure, a solid clear resin was produced having an esterification equivalent similar to that of the ethylene glycol condensation product.

*Example V*

Esterification of the resins of Examples I and II with fatty acids was carried out with linoleic acid and dehydrated castor-oil at proportions of 40% fatty acids to 60% resin. The reaction was stopped at an acid number of less than 3 at a temperature of about 250° C. and the mixture was maintained under nitrogen atmosphere.

There was also prepared a 24% fatty acid ester of the resins of Examples I and II using dehydrated castor-oil fatty acids and 76% resin. These resin esters were then modified with 20% by weight of urea-formaldehyde resin and baked at 150° C. with and without cobalt drier (cobalt naphthenate—1%) for one-half hour.

The resins having a melting point of 75–80° C. which were esterified with fatty acids and air-dried were harder and slightly less flexible than the corresponding esters of Epikote 1001 made under the same conditions. The chemical resistance of the polyether ester resin to 7% acetic acid and to Javel water was better than the corresponding esters of Epikote 1001. The resistance of the baked resin of this example to 10% sodium hydroxide was about the same as with the Epikote 1001 ester.

*Example VI*

A 30% urea-formaldehyde resin was interacted with the 70% polyether ester resin of Example V having 40% dehydrated castor-oil fatty acids and 60% polyether. Films were prepared employing a cobalt naphthenate drier (0.4% cobalt) and were air-dried. Other films were prepared employing a cobalt naphtenate drier (0.05% cobalt) and were baked for ½ hour at 150° C. Films were also cast on glass. Adhesion, flexibility and hardness were determined in comparison to the 30/70 urea-formaldehyde/Epikote dehydrated castor-oil ester, and it was found that adhesion and flexibility were better with the urea-formaldehyde polyether resin formula of the present invention.

| | Hardness Values [1] | | |
|---|---|---|---|
| | Air Drying ½ hour, Heat 150° C. ½ hour | Air Drying After 24 hours | Air Drying After 48 hours |
| D.C.O. Ester of Resin Used from Example IV (M.P. 70–80° C.) (Polyether Ester Resin 21–71A) | 313 | 153 | 257 |
| D.C.O. Ester of Epikote 1001/Urea-formaldehyde formula (26–71C) | 310 | 153 | 203 |
| D.C.O. Ester of Epikote 1004/Urea-formaldehyde formula (26–71D) | 315 | 157 | 222 |

The gloss was equivalent to that of the Epikote formulas.
[1] Hardness values are determined with a Persoz pendulum, a device which operates on the same principle as the Wilkinson & Parker-Siddle swinging beam hardness tester. (See Comptes Rendus Academy Science 1945, vol. 221, page 703.) The hardness of a film is expressed in the number of seconds required for the same decrease of amplitude.

*Example VII*

Polyether resins were prepared in accordance with the procedure outlined in Example II with the exception that the reaction was stopped when the melting point of the resin was at 60° C. This 60° C. melting point resin was mixed in an amount of 60 parts of resin with 40 parts of urea-formaldehyde resin in a solvent and coatings of this were baked on metal. These coatings were compared with coatings from the corresponding Epikote 1001 and Epikote 1004/urea-formaldehyde formulations. All films were baked for 1½ hours at 100–105° C. and for ½ hour at 145–150° C.

The polyether-urea-formaldehyde films, although slightly less adherent and less flexible than the Epikote films possessed better acid resistance and better hypochlorite resistance. By replacing urea-formaldehyde with the same amount of melamine-formaldehyde resin, harder films were produced and these harder films had similar properties to the urea-formaldehyde films. By increasing the baking temperature of the coating from 105° C. to 135° C., improved adhesion and flexibility were achieved with both the urea-formaldehyde and melamine-formaldehyde formulations.

Films were also baked on metal using an 80° C. melting point polyether resin prepared in the same manner as the 60° melting point resin. The resin was blended in 80/20 proportions and 70/30 proportions with urea-formaldehyde. Similar performance was obtained as in the case of the 60° C. melting point resin except that the baking temperature for optimum flexibility was raised to 145° C.

Additional polyether resin having a 92° C. melting point was formulated with 10%, 20%, 30%, 40% and 50% urea-formaldehyde resins and compared with the corresponding urea-formaldehyde formulae admixed with Epikote 834 and 1001. In each case, the films were baked for one hour at 125° C. and ½ hour at 145° C. These films (92° C. melting point) were thinner and harder than those containing urea-formaldehyde and Epikote, and although slightly more colored, had better resistance to acetic acid.

It was determined on the basis of maximum flexibility that the optimum proportions of urea-formaldehyde were between 30–40% and the optimum proportions of polyether resin having a melting point of 92° C. were 60–70%. The optimum baking temperatures were 125–145° C. The adhesion and hardness, as well as the resistance to acetic acid, were better with melamine-formaldehyde modification than with the urea-formaldehyde modification.

*Example VIII*

This example shows modification of a polyether resin having a melting point of 80° C. with phenol-formaldehyde to provide an increase in insolubility and infusibility. A 50–50 weight mixture of the polyether resin and of alkaline-condensed phenol-formaldehyde resin was prepared.

The phenol-formaldehyde resin was a "B stage resin" prepared from equal molar proportions of phenol and formaldehyde, in the presence of ammonium hydroxide catalyst. The 50–50 polyether-phenol-formaldehyde resin mixture was dissolved in 75/25 Cellosolve acetate-xylol solvent and coated on blackplate. The coating was baked for 20 minutes at 200–205° C. at a film weight of 3 milligrams per square inch and provided an adherent, chemically-resistant coating having good flexibility.

*Example IX*

This example illustrates the condensation of the polyether resins of the invention with an isocyanate cross-linking agent.

(a) A 25–75 weight mixture of tolylene diisocyanate and polyether resin having a melting point of 60° C. was prepared. The polyether resin used was made in accordance with Example II. This mixture had an increased viscosity at room temperature greater than that observed with an Epikote-isocyanate mixture. The mixture was coated on iron and baked at 120° C. for 5 minutes to produce a highly resistant, flexible coating.

(b) The procedure outlined under (a) above was repeated using 50% of a polyether resin having a melting point of between 75 and 80° C. with the same tolylene diisocyanate. Coatings of this mixture were applied to blackplate and baked for 10 minutes at 125° C. to produce chemically resistant films.

(c) The procedure outlined under (b) above was repeated with styrene/maleic anhydride heteropolymer and with pyromellitic dianhydride to produce satisfactory coatings on blackplate after baking 10 minutes at 125° C.

Although the foregoing illustrative examples describe typical cross-linking reactants for increasing the solvent resistance and infusibility of the polyether resins in accordance with the invention, other types of cross-linking agents may also be employed with advantage.

The polyether resins of the invention may be cross-linked by condensation with aldehydes such as formaldehyde, acetaldehyde and glyoxal. In general, the aldehyde condensation products have slightly higher molecular weights and are intermediate in their chemical properties between the properties of unmodified polyether resins and those polyether resins which are admixed with phenol-formaldehyde resins. In the latter case, the greater reactivity of the phenol-aldehyde resin component produces a higher degree of infusibility in admixture, whereas in the former case, lower melting points and lesser infusibility are observed.

The condensation illustrated hereinabove with a diisocyanate may be carried out with advantage with mono-isocyanates. For example, phenyl-isocyanate can be utilized to de-functionalize the terminal hydroxyl groups in the polyether resin, and thereby impart a higher degree of solvent solubility in cheaper aromatic solvents.

Additionally, it is possible to employ titanate esters and silicate esters as adhesion promoters to effect transesterification and condensation between the titanate or silicate groups and the hydroxyl groups of the polyethers of the invention. Titanates which may be employed include butyl titanate and ethyl titanate. In similar fashion, transesterification can be carried out using silicates such as ethyl and butyl silicate.

The invention is further described in the claims which follow.

We claim:

1. A polyether resin comprising the alkaline-condensation product of an alkali metal salt of a polyhydric phenol with a terminally substituted sulfate diester of an aliphatic polyhydric alcohol having terminal hydroxyl groups esterified with sulfuric acid, said product prepared by condensation at a temperature of at least 90° C., and said polyether resin being free from any sulfate ester and having a melting point of from at least 60° C. to about 115° C.

2. A polyether resin comprising the alkaline condensation product of an alkali metal salt of a polyhydric polynuclear phenol having the phenolic hydroxyl groups attached to different carbocyclic nuclei of said phenol with a terminally substituted sulfate diester of an aliphatic polyhydric alcohol having terminal hydroxyl groups esterified with sulfuric acid, said product prepared by condensation at a temperature of at least 90° C., and said polyether resin being free from any sulfate ester and having a melting point of from at least 60° C. to about 115° C.

3. A polyether resin as claimed in claim 2 wherein said phenol is di(4-hydroxyphenyl) methylmethane and said resin has a melting point of from 80° C. to about 95° C.

4. A polyether resin as claimed in claim 2 wherein said phenol is di(4-hydroxyphenyl) dimethylmethane and said resin has a melting point of between 80° C. to 95° C.

5. A polyether resin as claimed in claim 2 wherein said aliphatic polyhydric alcohol is glycerin.

6. A polyether resin as claimed in claim 2 wherein said aliphatic polyhydric alcohol is ethylene glycol.

7. A polyether resin as claimed in claim 2 wherein said aliphatic polyhydric alcohol is a mixture of glycerin and ethylene glycol.

8. A polyether resin as claimed in claim 2 wherein said aliphatic polyhydric alcohol is propylene glycol.

9. A composition of matter having as at least one component thereof a cross-linking agent selected from the group consisting of reactive isocyanates, polyanhydrides, aldehydes, phenol-aldehyde resins, melamine-aldehyde resins, urea-formaldehyde resins and mixtures of these and a polyether resin which is the alkaline-condensation product of an alkali metal salt of a polyhydric phenol with a terminally substituted sulfate diester of an aliphatic polyhydric alcohol having terminal hydroxy groups esterified with sulfuric acid, said product prepared by condensation at a temperature of at least 90° C. and said polyether resin being free from any sulfate ester and having a melting point of from at least 60° C. to about 115° C.

10. A composition of matter having as at least one component thereof a cross-linking agent selected from the group consisting of reactive isocyanates, polyanhydrides, aldehydes, phenol-aldehyde resins, melamine-aldehyde resins, urea-formaldehyde resins and mixtures of these and a polyether resin which is the alkaline-condensation product of an alkali metal salt of a polyhydric polynuclear phenol having the phenolic hydroxyl groups attached to different carbocyclic muclei of said phenol with a terminally substituted sulfate diester of an aliphatic polyhydric alcohol having terminal hydroxyl groups esterified with sulfuric acid, said product prepared by condensation at a temperature of at least 90° C., and said polyether resin being free from any sulfate ester and having a melting point of from at least 60° C. to about 115° C.

11. A composition of matter as claimed in claim 10 comprising up to 25% of tolylene diisocyanate and the remainder said polyether resin.

12. A composition of matter as claimed in claim 10 comprising up to 50% alkaline-condensed phenol-aldehyde "B stage resin" and the remainder being said polyether resin.

13. A composition as claimed in claim 10 comprising up to 40% of urea-formaldehyde resin and the remainder being said polyether resin.

14. A composition as claimed in claim 10 comprising up to 40% of melamaine-formaldehyde resin and the remainder being said polyether resin.

15. A process for making polyether resins which comprises reacting at a temperature of from —15 to +20° C., a polyhydric aliphatic alcohol bearing terminal primary hydroxyl groups with sulfuric acid having a strength of at least 95% to form the terminal disulfate ester of said alcohol, neutralizing said disulfate ester with an alkali at a temperature of up to about 20° C., and condensing the alkali salt of said disulfate ester with a polyhydric phenol in the presence of an alkali to convert said phenol to the alkali salt at a temperature of at least 90° C. whereby a polyether resin is formed having a melting point of at least 60° C. and up to 115° C.

16. A process as claimed in claim 15 wherein said sulfuric acid is reacted with said alcohol at a temperature less than 10° C.

17. A process for making polyether resins which comprises reacting at a temperature of from —5 to +20° C., a polyhydric aliphatic alcohol bearing terminal primary hydroxyl groups with sulfuric acid having a strength of at least 95% to form the terminal disulfate ester with an alkali at a temperature of up to about 20° C., and condensing the alkali salt of said disulfate ester with a polyhydric polynuclear phenol having the phenolic hydroxyl groups attached to different carbocyclic nuclei of said phenol in the presence of an alkali to convert said phenol to the alkali salt at a temperature of at least 90° C. whereby a polyether resin is formed having a melting point of at least 60° C. and up to 115° C.

18. A process as claimed in claim 17 wherein said phenol is di(4-hydroxyphenyl) dimethylmethane and said resin has a melting point of between 80° C. to 95° C.

19. A process as claimed in claim 17 wherein said polyhydric aliphatic alcohol is glycerin.

20. A process as claimed in claim 17 wherein said polyhydric aliphatic alcohol is a mixture of glycerin and ethylene glycol.

21. A process for making polyether resins which comprises reacting a polyhydric aliphatic alcohol bearing terminal sulfate groups with a polyhydric phenol in the presence of an alkali to convert said phenol to the alkali salt at a temperature of at least 90° C. whereby a polyether resin is formed having a melting point of at least 60° C. and up to 115° C.

22. A process for esterifying a polyether resin which is the alkaline-condensation product of an alkali metal salt of a polyhydric phenol with a terminally substituted sulfate diester of an aliphatic polyhydric alcohol having terminal hydroxyl groups esterified with sulfuric acid, said product prepared by condensation at a temperature of at least 90° C., and said polyether resin being free from any sulfate ester and having a melting point of from at least 60° C. to about 115° C. comprising, reacting up to 40% by weight of a fatty acid with the remaining 60% of said polyether resin at a temperature of from about 125° C. to about 250° C. to bring the acid number of the product to about 3.

References Cited in the file of this patent

UNITED STATES PATENTS

| | | |
|---|---|---|
| 2,060,715 | Arvin | Nov. 10, 1936 |
| 2,091,956 | Benner | Sept. 7, 1937 |